US010668796B2

(12) United States Patent
Heinze

(10) Patent No.: US 10,668,796 B2
(45) Date of Patent: Jun. 2, 2020

(54) WEATHERSTRIP ASSEMBLY AND METHOD OF ISOLATING DISSIMILAR METALS IN THE WEATHERSTRIP ASSEMBLY

(71) Applicant: COOPER-STANDARD AUTOMOTIVE INC., Novi, MI (US)

(72) Inventor: Mike Heinze, Canton, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 15/478,747

(22) Filed: Apr. 4, 2017

(65) Prior Publication Data

US 2017/0282699 A1 Oct. 5, 2017

Related U.S. Application Data

(60) Provisional application No. 62/317,938, filed on Apr. 4, 2016.

(51) Int. Cl.

| | |
|---|---|
| *E06B 7/16* | (2006.01) |
| *B60J 10/75* | (2016.01) |
| *B29C 48/12* | (2019.01) |
| *B29C 48/155* | (2019.01) |
| *B29D 99/00* | (2010.01) |
| *B60J 10/18* | (2016.01) |
| *B60J 10/265* | (2016.01) |

(Continued)

(52) U.S. Cl.
CPC .............. *B60J 10/75* (2016.02); *B29C 48/12* (2019.02); *B29C 48/155* (2019.02); *B29D 99/0053* (2013.01); *B60J 10/15* (2016.02); *B60J 10/18* (2016.02); *B60J 10/26* (2016.02); *B60J 10/265* (2016.02); *B60R 13/04* (2013.01); *B29C 48/2883* (2019.02); *B29K 2023/00* (2013.01); *B29K 2023/06* (2013.01); *B29K 2023/12* (2013.01); *B29K 2705/00* (2013.01); *B29L 2031/302* (2013.01)

(58) Field of Classification Search
CPC . B60J 10/75; B60J 10/18; B60J 10/265; B60J 10/15; B60J 10/26; B29C 47/026; B60R 13/04; B29K 2705/00; B29K 2023/00; B29L 2031/302
USPC ............................................... 49/490.1
See application file for complete search history.

(56) References Cited

U.S. PATENT DOCUMENTS

| | | | | |
|---|---|---|---|---|
| 3,448,550 A | * | 6/1969 | Herr ..................... | B60R 13/04 428/31 |
| 3,811,989 A | * | 5/1974 | Hearn ................... | B60R 13/04 428/122 |

(Continued)

OTHER PUBLICATIONS

PCT/US 17/25924 International Search Report and Written Opinion, dated Jan. 11, 2018.

*Primary Examiner* — Jerry E Redman
(74) *Attorney, Agent, or Firm* — Fay Sharpe LLP

(57) ABSTRACT

A weatherstrip assembly includes a body having a carrier or core formed from a first metal for providing strength and rigidity to the body. A show surface of the weatherstrip assembly is formed of a second metal different than the first metal. The second metal acts as the show surface of the weatherstrip assembly. An isolative, electrically low conductivity layer is received only on portions of the first metal that are disposed adjacent to portions of the second metal and potentially subject to electrical contact therebetween.

11 Claims, 1 Drawing Sheet

(51) Int. Cl.
   *B60J 10/15*   (2016.01)
   *B60J 10/26*   (2016.01)
   *B60R 13/04*   (2006.01)
   *B29L 31/30*   (2006.01)
   *B29K 23/00*   (2006.01)
   *B29K 705/00*   (2006.01)
   *B29C 48/285*   (2019.01)

(56) References Cited

U.S. PATENT DOCUMENTS

| | | | | |
|---|---|---|---|---|
| 4,291,076 A | * | 9/1981 | Katoh | B60R 13/07 293/126 |
| 4,367,113 A | * | 1/1983 | Karim | B32B 27/04 156/327 |
| 4,949,507 A | * | 8/1990 | Vaughan | B60J 10/21 428/122 |
| 5,066,542 A | * | 11/1991 | Tabor | B32B 15/08 428/461 |
| 5,207,027 A | * | 5/1993 | Larsen | B60J 10/265 428/122 |
| 5,435,865 A | * | 7/1995 | Lee | B29C 63/44 156/213 |
| 5,456,786 A | * | 10/1995 | Cook | B29C 47/003 156/244.11 |
| 5,493,815 A | | 2/1996 | Belser et al. | |
| 6,534,147 B2 | | 3/2003 | Gopalan | |
| 6,681,526 B2 | * | 1/2004 | Mueller | B60J 10/265 49/377 |
| 6,742,304 B1 | * | 6/2004 | Mueller | B60J 10/265 49/377 |
| 7,979,972 B2 | * | 7/2011 | Tamura | B23P 19/047 29/451 |
| 8,226,143 B2 | * | 7/2012 | Takeuchi | B60R 13/04 296/1.08 |
| 8,302,350 B2 | * | 11/2012 | Lee | B60J 10/87 49/440 |
| 8,819,997 B2 | * | 9/2014 | Bouvatier | B60R 13/04 49/440 |
| 8,881,463 B2 | | 11/2014 | MacDonald et al. | |
| 9,003,709 B2 | * | 4/2015 | Patterson | B60J 10/75 49/377 |
| 9,963,088 B2 | * | 5/2018 | Yoshida | B60J 10/30 |
| 2012/0110916 A1 | | 5/2012 | Gopalan et al. | |
| 2013/0093141 A1 | | 4/2013 | Guellec | |
| 2014/0183901 A1 | * | 7/2014 | Jun | B60R 13/04 296/146.2 |
| 2014/0309344 A1 | * | 10/2014 | Yu | C08L 23/10 524/100 |
| 2014/0329961 A1 | * | 11/2014 | Sengupta | C08F 210/02 524/563 |
| 2017/0136747 A1 | * | 5/2017 | Torradas | B29C 48/08 |
| 2018/0001603 A1 | * | 1/2018 | Klosin | B32B 7/12 |
| 2019/0062820 A1 | * | 2/2019 | Klapperich | B01L 3/5023 |

\* cited by examiner

WEATHERSTRIP ASSEMBLY AND METHOD OF ISOLATING DISSIMILAR METALS IN THE WEATHERSTRIP ASSEMBLY

This application claims the priority benefit of U.S. provisional application Ser. No. 62/317,938, filed Apr. 4, 2016, the entire disclosure of which is expressly incorporated herein by reference.

BACKGROUND

The present disclosure relates to a weatherstrip assembly that includes dissimilar metals, and an associated method of isolating dissimilar metals in the assembly.

Commonly owned U.S. Pat. No. 5,618,593 discloses a weatherstrip molding having a an EPDM body with a first portion having a durometer hardness (approximately 90 Shore A or greater) greater than that of the remainder of the body (a durometer hardness no greater than approximately 70 Shore A). A laminated film is bonded onto the first portion of the body, with the laminated film including a layer of FLUOREX® (a weatherable polymeric product which comprises polyvinylidene fluoride as the major constituent) and a layer of polypropylene. FLUOREX® is a registered trademark of the Rexham Corporation of Matthews, N.C. Preferably, especially in belt weatherstrips and glass run weatherstrips, a metal reinforcing core is included, with the EPDM body being coextruded onto the core. In such applications, a flock or low friction layer or coating material is adhered to the second portion of the body.

The weatherstrip assembly with the laminated film material bonded onto the first portion of the body offers improved characteristics in terms of better weatherability and damage resistance for the decorative laminated film, while still retaining the sealing capabilities of the remainder of the body. In addition, the laminated film provides superior results in terms of resistance to ultraviolet rays, salt solutions, oxidation, and other environmental conditions.

Galvanic corrosion is a well-known process that results from two different metals with different electrical potentials being in electrical contact, and one of the metals corrodes. This corrosive action occurs when an electrolyte is present. The electrolyte allows the metallic ions from one metal to migrate to the other metal due to the differing electrical potentials. Although this action may be desirable in some situations (e.g., a battery), galvanic corrosion is not desirable in other instances such as structural components mounted on automotive vehicles.

In a modified version of the weatherstrip assembly described in the commonly owned U.S. Pat. No. 5,618,593, a bright strip or metal cap is provided along a portion of an external show surface of the weatherstrip assembly. Oftentimes, the metal cap is a stainless steel structure and the underlying carrier is a dissimilar metal, such as a different steel or more commonly an aluminum carrier incorporated into the weatherstrip assembly. When exposed in the environment, the potential exists that these dissimilar metals come into electrical contact, and thus result in galvanic corrosion. In an effort to address corrosion issues, the industry briefly used a mylar film sheet to isolate dissimilar metals. However, this generally did not work due to positional tolerances of the film application of the mylar film sheet during the roll forming and extrusion process associated with forming the weatherstrip. Further, during installation of the metal cap, the underlying film was caught and the physical barrier between the dissimilar metals was compromised. Vehicles in the field evidenced corrosion issues.

Accordingly a need exists for limiting the potential for galvanic corrosion in connection with an assembly such as a weatherstrip that includes dissimilar metals, and an associated method of isolating dissimilar metals in the assembly to prevent such galvanic corrosion.

SUMMARY

A weatherstrip assembly includes a body having, at least in part, a carrier formed from a first metal for providing strength and rigidity to the body, and a show surface formed of a second metal different than the first metal. The second metal acts at least in part as a show surface of the weatherseal assembly, and an isolative, electrically non-conductive layer or low conductivity layer (such as an olefinic based polymer) is received only on portions of the first metal that are disposed adjacent to portions of the second metal and potentially subject to electrical contact therebetween.

A preferred method of isolating dissimilar metals includes forming a weatherstrip assembly body that includes providing a carrier formed from a first metal for providing strength and rigidity to the body. The method further includes providing a second metal different than the first metal where the second metal acts at least in part as a show surface of the weatherstrip assembly. Further, the method includes isolating those portions of the first metal that are disposed adjacent to portions of the second metal and potentially subject to electrical contact with an electrically non-conductive layer or low conductivity layer such as an olefinic based polymer.

A primary benefit resides in the ability to limit the potential for galvanic corrosion.

The related advantage is the ability to easily incorporate the solution into existing manufacturing methods and product design.

Still another benefit is associated with the limited amount of material, and thus reduced cost and weight associated with the new weatherstrip assembly and associated method that addresses the galvanic corrosion issue.

Still other benefits and advantages of the present disclosure will become more apparent from reading and understanding the following detailed description.

DETAILED DESCRIPTION

Figure 1:
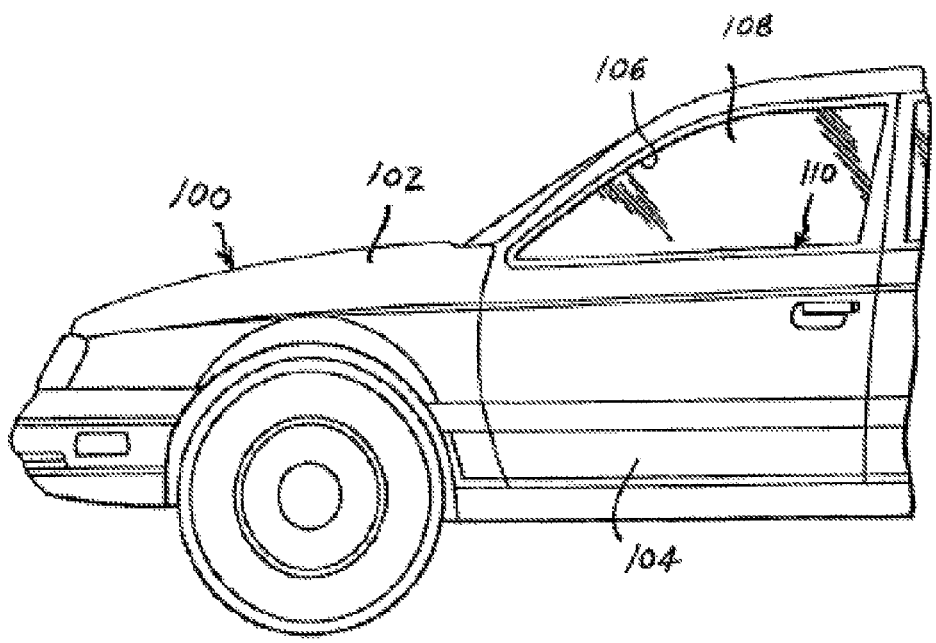
FIG. 1 is an elevational view of a representative automotive vehicle.

Turning to the Figures, there is shown an automotive vehicle 100 that includes a vehicle body assembly 102 that includes at least first and second doors 104. An opening 106 is provided in the vehicle body assembly and a movable window 108 is typically raised and lowered relative to the vehicle body (door) to selectively open and close the opening. One or more weatherstrips or weatherstrip assemblies 110 are provided on the vehicle body assembly including around the window 108.

Figure 2:
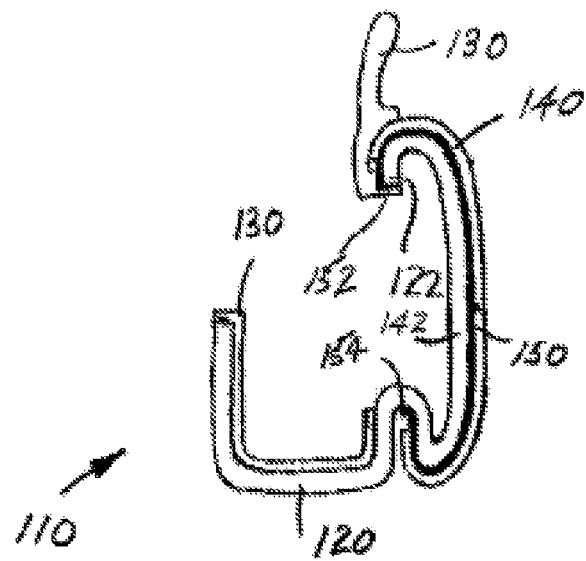
FIG. 2 is a cross-sectional view of the weatherstrip assembly taken generally along the lines 2-2 of FIG. 1.

As illustrated in FIG. 2, the exemplary weatherstrip 110 preferably includes a preformed, metal reinforcing core or carrier 120. In a preferred embodiment, the carrier 120 has a predetermined configuration provided for attachment to the vehicle 100 and locating a seal portion(s) 130 at a desired location(s) on the carrier. In addition, a bright strip 140 is mechanically secured over a mushroom-shaped portion 142 of the carrier 120 that faces outwardly from the vehicle 100. The bright strip 140, for example, may be a C-shaped, stainless steel structure that slides onto or is mechanically received over the mushroom-shaped portion 142 of the carrier 120, i.e., the C-shaped structure of the bright strip 140 conforms to the similarly shaped portion 142 of the carrier 120 to provide mating receipt thereover. As noted in the background, in the past, this arrangement would typically have situated the stainless steel bright strip 140 into contact with the aluminum carrier (although it will be understood by one skilled in the art that still other dissimilar metals could be used rather than the aluminum of the carrier, and the stainless steel associated with the bright strip 120). This would, in turn, potentially lead to galvanic corrosive action.

Since prior solutions have been ineffective for one or more reasons, an alternative solution is desired. To that end, a thinner gauge of stainless steel may be used to form the cap 140. In addition, a thin isolating layer 150 such as a coextruded layer of olefinic-based polymer (by way of example only, a thickness ranging from about 0.2 mm to about 1.0 mm) of an extrudable material is provided where the isolating layer material has very low electrical conductivity. More preferably, the isolating material has a minimum thickness of 0.2 mm although the upper thickness range may vary somewhat; however, because the isolating layer is formed of a costly material, use of a thinner layer is likely preferred. Exemplary materials used for the isolating layer include olefinic-based polymers. Preferably the isolating layer material 150 is applied (preferably co-extruded for ease of manufacture) over only desired, limited surface area portions of the carrier 120 (or could also be applied, e.g., preferably co-extruded over desired portions of the bright strip or cap 140). As a result, a significant savings in isolating layer material 150 is achieved by coextruding only portions of the surface area of the aluminum core carrier 120 (or the bright strip/cap 140) to receive the isolating layer material, rather than coating the entirety of the carrier (or bright strip/cap). For example, and as illustrated in FIG. 2, the isolating layer material 150 is received over the mounting portion 142 of the carrier 120, or surface portions of the carrier that are in potential electrical contact with the bright strip/cap 140 that is received over that surface. Likewise, if the isolating layer material 150 is applied to the bright strip/cap 140, then the amount of isolating layer material used is limited to those portions or regions where potential electrical contact with the carrier 120 might occur. This selective application of the isolating layer material 150 on only portions of the carrier 120 (or the bright strip/cap 150) reduces the overall amount of isolating layer material 150 used in the weatherstrip assembly. For example, in a preferred manufacturing process, the isolating layer material 150 is coextruded over only the outer surface of the mushroom-shaped portion of the carrier 120, including a region 152 extending over a terminal end 122 of the carrier and proceeding continuously along an outer surface contour of the mushroom-shaped portion beneath the bright strip 140 (beneath the C-shaped contour of the bright strip) and terminating in a recess 154 that extends beyond the edge of the terminal end of the C-shaped bright strip 140. The isolating layer 150 isolates the stainless steel bright strip/cap 140 from the aluminum carrier/core 122 to prevent galvanic reaction between the dissimilar metals.

Moreover, a thinner gauge stainless steel can be used for the bright strip 140, or alternatively, less Fluorex material can be used as a part of a laminated film that is typically bonded onto the weatherstrip as shown and described in commonly owned U.S. Pat. No. 5,618,593. By using the coextruded isolating layer 150, or other isolating material that is preferably coextruded on the carrier 120, the location of the isolating layer material on the carrier is much more accurately controlled. Moreover, the desired thickness of the isolating layer 150 is substantially greater than that associated with previously used Mylar film. The increased thickness of the isolating layer material 150 prevents intrusion (previously the Mylar strip could be inadvertently cut or damaged during installation) of the bright strip (cap) 140 and further limits the potential for electrical conductivity to be established between the two dissimilar metals associated with the carrier 120 (e.g., aluminum) and the bright strip 140 (e.g., stainless steel).

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A weatherstrip assembly comprising:
a body that includes, at least in part,
a carrier formed from a first metal for providing strength and rigidity to the body, the carrier having a first, vehicle mounting portion configured for connection to an associated vehicle and a second, show surface mounting portion adjacent the vehicle mounting portion having a mushroom-shaped conformation in cross-section, and
a show surface formed of a second metal different than the first metal where the second metal has a C-shaped conformation which receives the show surface mounting portion of the carrier and the second metal acts at least in part as a show surface of the weatherseal assembly, and
an electrically non-conductive layer of a minimal amount received on only the mushroom-shaped show surface mounting portion of the first metal of the carrier disposed adjacent to portions of the second metal and the first metal, respectively, and potentially subject to electrical contact therebetween.

2. The weatherstrip assembly of claim 1 wherein the electrically non-conductive layer is extruded on to select portions of the first metal.

3. The weatherstrip assembly of claim 2 wherein the electrically non-conductive layer is an olefinic-based polymer.

4. The weatherstrip assembly of claim 3 wherein the electrically non-conductive layer has a thickness ranging from about 0.1 mm to about 0.2 mm.

5. The weatherstrip assembly of claim 3 wherein the electrically non-conductive layer has a minimum thickness of about 0.2 mm.

6. The weatherstrip assembly of claim 1 wherein the electrically non-conductive layer is an olefinic-based polymer.

7. The weatherstrip assembly of claim 1 wherein the electrically non-conductive layer has a thickness ranging from about 0.1 mm to about 0.2 mm.

8. The weatherstrip assembly of claim 1 wherein the electrically non-conductive layer has a minimum thickness of about 0.2 mm.

9. The weatherstrip assembly of claim 1 wherein the electrically non-conductive layer is an olefinic-based polymer having a minimum thickness of 0.2 mm and is received only on a surface of the mushroom-shaped show surface mounting portion facing the C-shaped show surface received thereon.

10. A weatherstrip assembly comprising:
a body that includes, at least in part,
a carrier formed from a first metal for providing strength and rigidity to the body, the carrier having a first, vehicle mounting portion configured for connection to an associated vehicle and a second, show surface mounting portion adjacent the vehicle mounting portion having a mushroom-shaped conformation in cross-section, and
a show surface formed of a second metal different than the first metal where the second metal has a C-shaped conformation which receives the show surface mounting portion of the carrier and the second metal acts at least in part as a show surface of the weatherseal assembly, and
an electrically non-conductive layer received on only the mushroom-shaped show surface mounting portion of the first metal of the carrier disposed adjacent to portions of the second metal, and potentially subject to electrical contact between the first and second metals of the carrier and the show surface, wherein the electrically non-conductive layer is an olefinic-based polymer has a minimum thickness of about 0.2 mm that isolates the first metal of the carrier from galvanic reaction with the second metal of the show surface.

11. The weatherstrip assembly of claim 10 wherein a remainder of the carrier is void of the olefinic-based polymer.

* * * * *